United States Patent
Rickenbach et al.

(10) Patent No.: US 9,108,589 B2
(45) Date of Patent: Aug. 18, 2015

(54) PROTECTIVE FLAP FOR AIRBAGS

(71) Applicant: Autoliv ASP, Inc., Ogden, UT (US)

(72) Inventors: Roger Rickenbach, Farr West, UT (US); Terry Alan Wheelwright, Morgan, UT (US); Don Parker, Layton, UT (US); Andy Holliday, Ogden, UT (US); Megan Donehue, North Salt Lake, UT (US)

(73) Assignee: AUTOLIV ASP, INC., Ogden, UT (US)

( * ) Notice: Subject to any disclaimer, the term of this patent is extended or adjusted under 35 U.S.C. 154(b) by 3 days.

(21) Appl. No.: 14/070,489

(22) Filed: Nov. 2, 2013

(65) Prior Publication Data

US 2015/0123382 A1  May 7, 2015

(51) Int. Cl.
  *B60R 21/237* (2006.01)
  *B60R 21/207* (2006.01)
  *B60R 21/215* (2011.01)
  *B60R 21/231* (2011.01)

(52) U.S. Cl.
  CPC ............ *B60R 21/237* (2013.01); *B60R 21/207* (2013.01); *B60R 21/215* (2013.01); *B60R 21/23138* (2013.01); *B60R 2021/23146* (2013.01)

(58) Field of Classification Search
  USPC ............................................ 280/730.2, 728.2
  See application file for complete search history.

(56) References Cited

U.S. PATENT DOCUMENTS

| | | | |
|---|---|---|---|
| 5,452,913 A | 9/1995 | Hansen et al. | |
| 5,944,342 A * | 8/1999 | White et al. | 280/729 |
| 6,478,329 B1 * | 11/2002 | Yokoyama | 280/729 |
| 6,543,803 B1 * | 4/2003 | Harada et al. | 280/730.2 |
| 6,827,368 B2 * | 12/2004 | Jang et al. | 280/729 |
| 7,942,441 B2 * | 5/2011 | Magnin et al. | 280/740 |
| 7,980,585 B2 * | 7/2011 | Cheal | 280/728.2 |
| 8,056,924 B2 * | 11/2011 | Hatfield et al. | 280/730.2 |
| 8,091,918 B2 * | 1/2012 | Mitchell et al. | 280/728.2 |
| 8,240,701 B2 * | 8/2012 | Cheal et al. | 280/728.2 |
| 2011/0042923 A1 * | 2/2011 | Hatfield et al. | 280/730.2 |

* cited by examiner

*Primary Examiner* — Faye M Fleming
(74) *Attorney, Agent, or Firm* — Stoel Rives LLP

(57) ABSTRACT

An airbag assembly can include an airbag cushion and a protective flap. In some arrangements, the protective flap is positioned over at least a portion of an inflatable region of the airbag cushion to prevent the inflatable region of the airbag cushion from being pinched due to securement of the airbag cushion to a mounting member via which the airbag assembly can be secured to a vehicle.

20 Claims, 9 Drawing Sheets

PROTECTIVE FLAP FOR AIRBAGS

TECHNICAL FIELD

The present disclosure relates generally to the field of automotive protective systems. More specifically, the present disclosure relates to inflatable airbag cushions and related assemblies, particularly systems and devices that are used in placing an airbag in a packaged state and/or that are present when the airbag is in the packaged state.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Figure 1A:
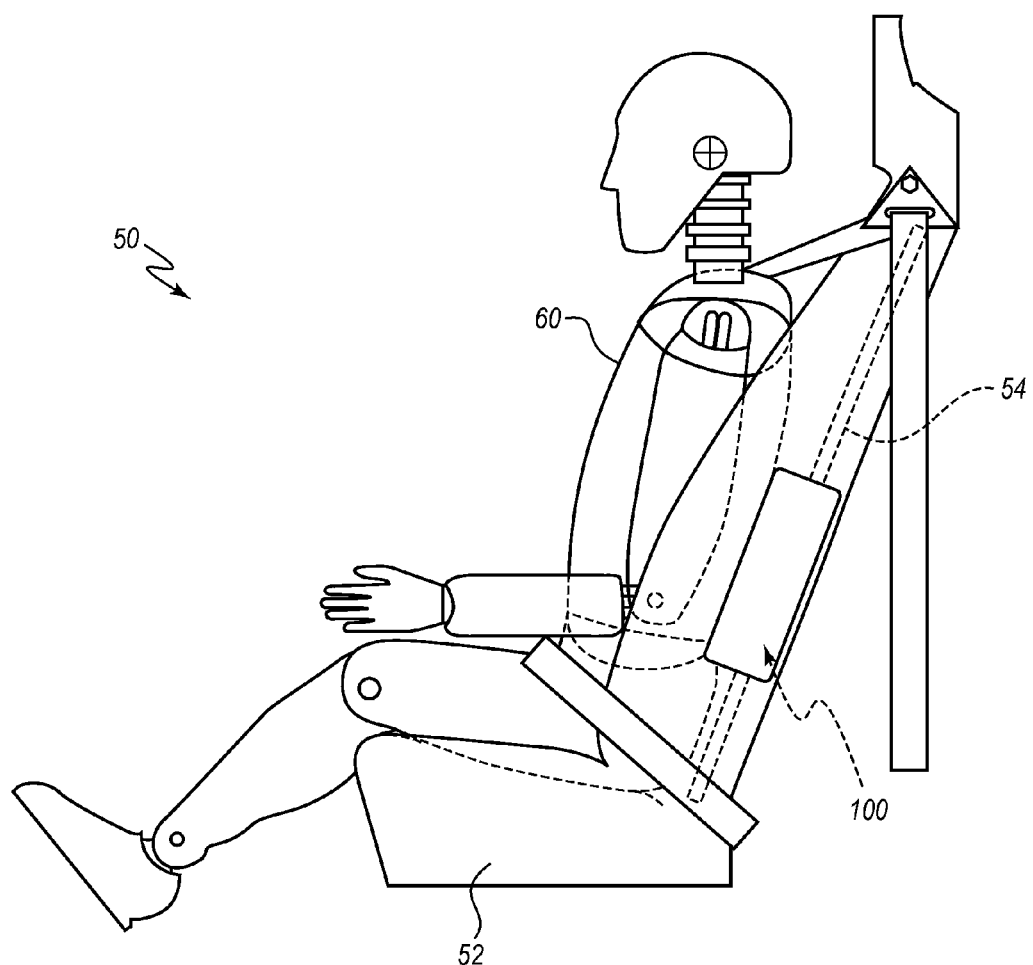
FIG. 1A is an elevation view of a vehicle occupant in a seat of a vehicle that includes an embodiment of a side airbag assembly mounted therein, wherein the side airbag assembly is in a packaged state.

It will be readily understood that the components of the embodiments as generally described and illustrated in the figures herein could be arranged and designed in a wide variety of different configurations. Thus, the following more detailed description of the illustrated embodiments is not necessarily intended to limit the scope of the disclosure and is intended to be representative of various embodiments. Further, where appropriate, any suitable feature of any of the embodiments described herein can be combined with any of the other embodiments. The drawings are not necessarily drawn to scale unless specifically indicated.

Inflatable airbag systems are widely used to minimize occupant injury in a collision scenario. Airbag modules have been installed at various locations within a vehicle, including, for example, the steering wheel, the instrument panel, within the side doors or side of seats, within seats so as to adjust the leg position of an occupant, adjacent to roof rail of the vehicle, in an overhead position, at the knee or leg position, etc. In the following disclosure, "airbag" may refer to a side airbag, an inflatable curtain airbag, an overhead airbag, a front airbag, a knee airbag, or any other airbag type. However, the embodiments discussed hereafter are primarily of a side airbag variety. Nevertheless, it may be possible to employ at least some of the features of the airbags thus described with other airbag varieties, where suitable.

Side airbags are typically installed in a side bolster of a seatback. During assembly and/or installation, the airbags can be rolled, folded, and/or otherwise packaged, and they can be maintained in the packaged state at an interior of the bolster. The airbags can be retained within a soft or flexible cover, and are generally attached to a frame portion of the seatback in any suitable manner, whether directly attached or indirectly attached via one or more plates, brackets, or other intermediate components. During a deployment event, such as may be due to a collision or near collision, vehicle sensors can trigger the activation of an inflator, which rapidly fills the airbag with inflation gas. The airbag can rapidly change conformation from the packed configuration to an expanded configuration that can prevent an occupant from being injured or reduce the severity of injuries sustained.

Side airbags can generally deploy at a side of a vehicle occupant's torso and/or head so as to protect the occupant from contacting a side of the vehicle. For example, in certain embodiments, the side airbags may be installed in front and/or rear seats and can be configured to deploy so as to prevent, inhibit, delay, or reduce an impact between the occupants and one or more of, for example, a door, a pillar, or a window. In various embodiments, when deployed, the side airbags can generally inflate in a forward direction and/or in an upward direction, relative to the vehicle, to fill space between the vehicle occupant and an interior surface of the vehicle.

Figure 1B:
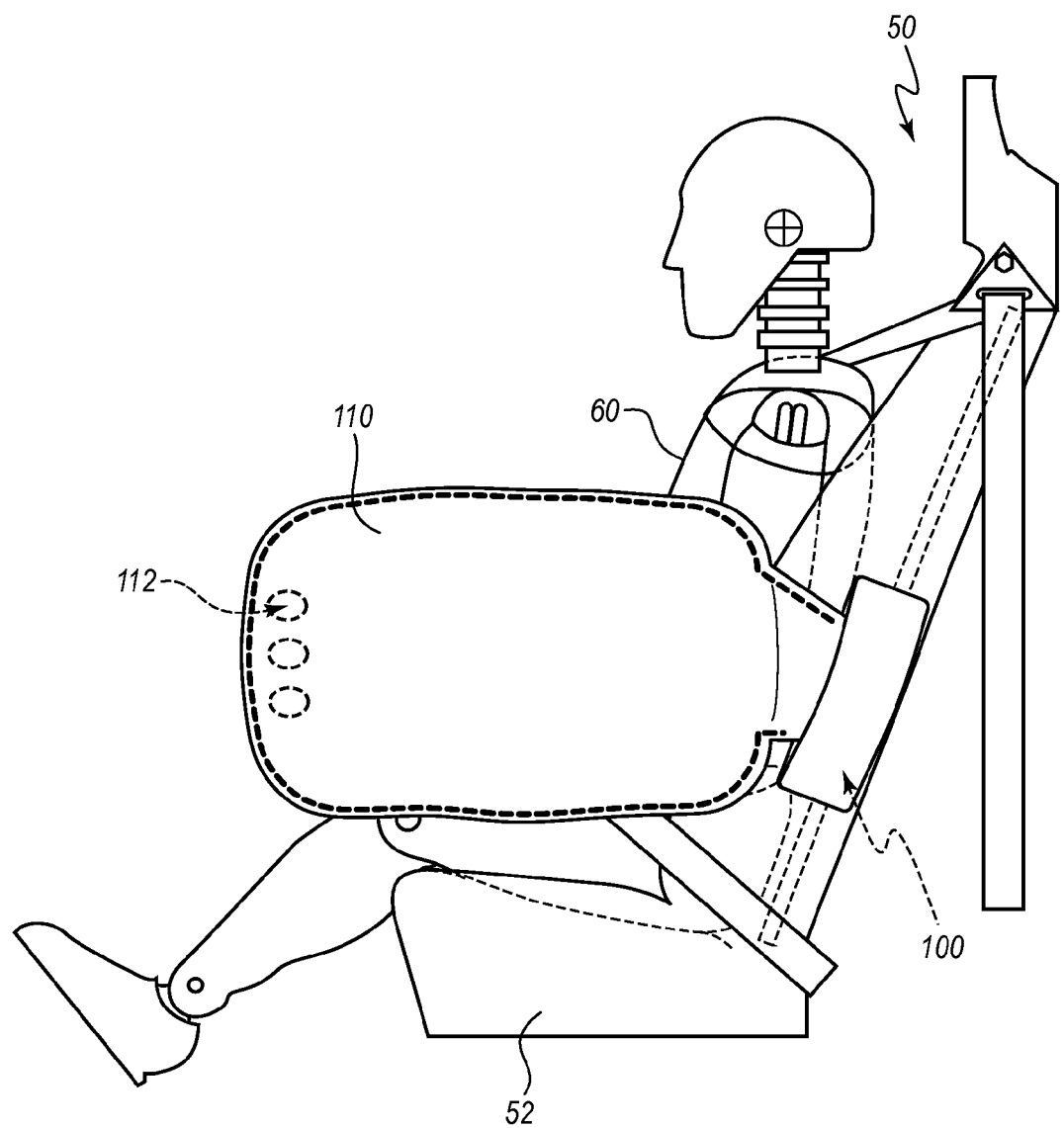
FIG. 1B is an elevation view such as that of FIG. 1A that depicts the side airbag assembly in a deployed state.
Figure 2:
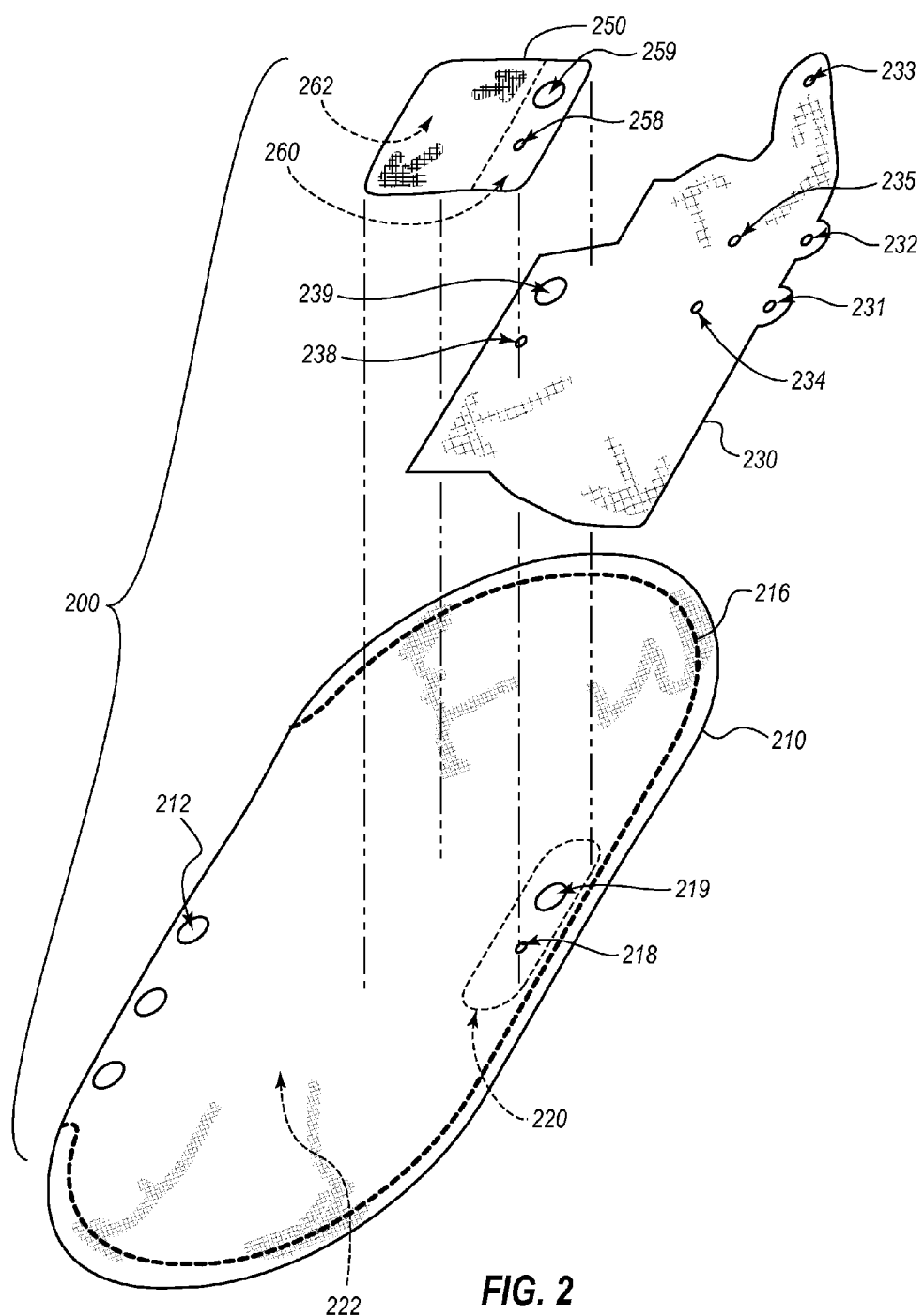
FIG. 2 is an exploded perspective view of another embodiment of a side airbag assembly that includes a protective flap.

FIGS. 1A and 1B illustrate an embodiment of an airbag assembly 100 that is installed in a vehicle 50. The airbag assembly 100 can be mounted to the vehicle 50 in any suitable manner, such as those presently known in the art. In the illustrated embodiment, the airbag assembly 100 is attached to the vehicle 50 within a side bolster of seat 52. In particular, the airbag assembly 100 is mounted to a frame 54 of a seatback portion of the seat 52. The airbag assembly 100 thus may also be referred to as a side airbag assembly.

The airbag assembly 100 includes an airbag cushion 110 that is configured to transition from a packaged state to a deployed state in manners such as described above. Accordingly, the airbag cushion 110 can be configured to protect a vehicle occupant 60 from harmful contact with a side of the vehicle 50. The airbag cushion 110 can be configured to deploy in a predetermined manner, which can be affected by the ease with which the airbag cushion 110 is permitted to move out of the seat bolster and/or by the presence and orientation of one or more openings in the airbag cushion 110 through which inflation gas can escape. In the illustrated embodiment, the airbag cushion 110 includes a plurality of openings or vents 112 that allow inflation gas to exit from the airbag cushion 110 due to compression of the airbag cushion 110 by the vehicle occupant 60. The presence of one or more additional openings in the airbag cushion 110 through which inflation gases could escape could affect the deployment characteristics of the airbag cushion 110, which can be undesirable. As discussed further below, certain embodiments of airbag assemblies described herein include features that prevent pinching of an airbag cushion 110 and/or prevent the undesired creation of openings in the airbag cushion 110 when the airbag cushion 110 is in the packaged state and/or is installed in the vehicle 50. Certain embodiments thus can provide for predictable and reliable deployment of the airbag cushions 110.

FIGS. 2-7 illustrate another embodiment of an airbag assembly 200 such as the airbag assembly 100 discussed above. The airbag assembly 200 can be configured for use as a side airbag assembly, but may have a different configuration upon deployment than the airbag assembly 100. The airbag assembly 200 can include an airbag cushion 210, a wrapper 230, and a protective flap 250. The airbag cushion 210 and the wrapper 230 may be of any suitable variety. For example, the airbag cushion 210 can define an inflatable membrane that includes one or more pieces of any suitable material, such as those that are well known in the art (e.g., woven nylon fabric). The membrane can define an inflatable interior or cavity 214 (see FIG. 7) that can receive inflation gases therein. The airbag cushion 210 may be manufactured using a variety of techniques, such as, for example, one or more of one-piece weaving and cut-and-sew techniques. In various embodiments, the cushion membrane may be manufactured using sealed or unsealed seams 216, wherein the seams are formed by stitching, adhesive, taping, radio frequency welding, heat sealing, or any other suitable technique or combination of techniques.

The airbag cushion 210 can include vents 212, such as those discussed above. The airbag cushion 210 can have one or more openings 218, 219 that can be used to attach the airbag cushion 210 to the vehicle. In some embodiments, an inflator 270 may be attached to airbag cushion 210 via the one or more openings 218, 219 as discussed further below. For example, in the illustrated embodiment, the opening 219 is larger than the opening 218 to permit a portion of the inflator 270 to pass through the opening 219, as discussed further below.

A portion of the airbag cushion 210 that is in the vicinity of the openings 218, 219 defines an attachment region 220 of the airbag cushion 210. More generally, the portion of the airbag cushion 210 that is used for attaching the airbag cushion 210 to a portion of the vehicle 50 constitutes the attachment region 220. As discussed further below, the attachment region 220 can be secured to a portion of the vehicle (e.g., a seatback frame 54) so as to be stationary or fixed relative thereto. Extending outwardly from the attachment region 220 of the airbag cushion 210 is an inflatable region 222. In some embodiments, substantially all of the airbag cushion 210 may be inflatable or expandable. However, the inflatable region 222 of the airbag cushion 210 generally constitutes that portion of the airbag cushion 210 that is configured to change configurations during a deployment event. For example, whereas the attachment region 220 generally remains fixed relative to the portion of the vehicle 50 to which it is attached during a deployment event, the inflatable region 222 expands and/or moves away from the attachment region 220 during the deployment event.

The wrapper 230 may also be referred to as a soft cover or sleeve. The wrapper 230 can comprise any suitable material, such as those that are well known in the art. For example, the wrapper 230 may include a woven textile material, a non-woven textile material, a plastic or woven sheet, etc. The wrapper 230 can be flexible and may generally conform to an outer profile of the airbag cushion 210 when the cushion is in a packaged, compressed, or compacted state. The wrapper 230 can aid in maintaining the airbag cushion 210 in the compacted state during manufacture of the airbag assembly 200, transport of the airbag assembly 200 to a vehicle manufacturer, installation of the airbag assembly 200 within a vehicle, or standard use of a vehicle within which the airbag assembly 200 is installed. The wrapper 230 and compacted airbag cushion 210 may be referred to as a soft pack, in some instances. The wrapper 230 can be configured to split, burst, unwrap, or otherwise yield in any suitable manner to permit the airbag cushion 210 to transition from the compacted state to a deployed or expanded state during a deployment event, such as a collision. For example, in some embodiments, the wrapper 230 may include a tear seam or line of weakness (not depicted in the drawings) at any suitable position or portion of the wrapper 230 that may be configured to easily tear during a deployment event to release the expanding airbag cushion 210. The wrapper 230 is shown in a pre-packaged state in FIG. 3 and is shown in a packaged state in FIG. 6.

In certain embodiments, the wrapper 230 can have one or more openings 231, 232, 233 that can be used to secure the wrapper 230 in the packaged state, such as via cooperation with one or more fasteners. In some embodiments, the wrapper 230 defines one or more openings 238, 239 that can be aligned with the openings 218, 219, respectively, of the airbag cushion 210. In some embodiments, the wrapper 230 can have one or more openings 234, 235 that can be used for visual or optical sensor evaluation of whether or not the airbag assembly 200 has been properly assembled, as discussed further below.

The protective flap 250 may also be referred to as a protective band or protective strip. The protective flap 250 may be formed of any material suitable for the functions discussed herein. In some embodiments, the protective flap 250 comprises a flexible material. For example, in some embodiments, the flap 250 is as flexible as or is more flexible than one or more of the airbag cushion 210 and the wrapper 230. In some embodiments, the flap 250 comprises a nonwoven material, such as nonwoven polyester (e.g., a nonwoven polyester having mass of 85 grams per square meter). In some embodiments, the flap 250 is formed from the same material as either of the airbag cushion 210 or the wrapper 230. In other embodiments, the flap 250 may be stiffer than one or more of the airbag cushion 210 or the wrapper 230 and/or may comprise a material that is more durable or wear resistant than one or more of the airbag cushion 210 or the wrapper 230.

In some embodiments, the flap 250 has one or more openings 258, 259 that can be aligned with the openings 218, 238 and 219, 239, respectively, of the airbag cushion 210 and the wrapper 230. The openings 218, 219, 238, 239, 258, 259 can be used with fasteners for coupling the airbag assembly 200 to the vehicle 50. Further, in the illustrated embodiment, the openings 219, 239, 259 can be sufficiently large to permit the inflator 270 to pass through them into the cavity 214 defined by the airbag cushion 210.

Figure 4:
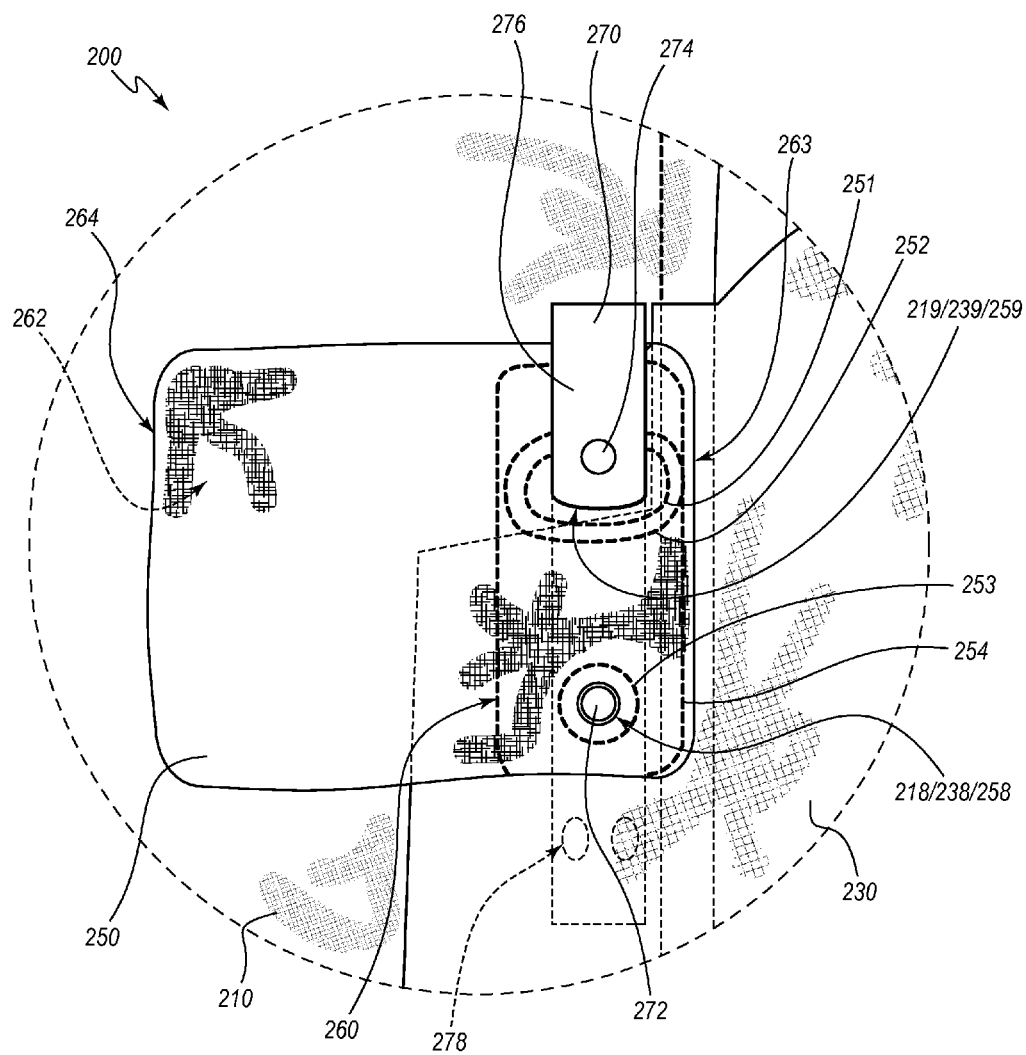
FIG. 4 is an enlarged view of the side airbag assembly of FIG. 2 taken along the view line 4 in FIG. 3.

In certain embodiments, the flap 250 is attached to one or more of the airbag cushion 210 and the wrapper 230. For example, in the illustrated embodiment, the flap 250 is attached to each of the airbag cushion 210 and the wrapper 230 via attachment seams 251, 252, 253, 254, as shown in FIG. 4. The seams 251, 252, 253, 254 can be of any suitable variety, such as may be formed via stitching, adhesives, taping, welds (e.g., ultrasonic or radio frequency welding), heat sealing, etc.

In the illustrated embodiment, two seams 251, 252 fully encompass the openings 219, 239, 259. In other embodiments, a single seam may be used. In other or further embodiments, one or more seams 251, 252 may encompass only a portion of the openings 219, 239, 259, or may merely pass near the openings without encompassing the openings. The illustrated embodiment includes a seam 253 that encompasses the openings 218, 238, 258. A further seam 254 encompasses both sets of openings 218, 238, 258 and 219, 239, 259, and also encompasses the seams 251, 252, 253. Other arrangements for one or more seams are contemplated, as further discussed below.

The flap 250 can include an anchoring region 260 and a retaining region 262. The anchoring region 260 can be configured to be substantially fixed relative to the attachment region 220 of the airbag cushion 210. For example, in the illustrated embodiment, the anchoring region 260 of the flap 250 is fixedly secured to the attachment region 220 of the airbag cushion 210, and thus is fixed relative to the attachment region 220. The anchoring region 260 can be at a proximal end 263 of the flap 250.

The retaining region 262 extends from the anchoring region 260 and terminates at a free end 264, which may also be referred to as a distal end of the flap 250. The terms proximal and distal are used relative to a features proximity to the inflator 270. In the illustrated embodiment, the free end 264 is devoid of permanent attachment to the airbag cushion 210 or to any other portion of the airbag assembly 200.

As discussed below, the retaining region 262 of the flap 250 can be readily movable relative to the inflatable region 222 of the airbag cushion prior 210 to and/or during various stages of packaging the airbag cushion 210. For example, when the airbag cushion 210 is transitioned from the orientation shown in FIG. 3 to the orientation shown in FIG. 5, the retaining region 262 of the flap 250 can be moved so as to extend over a portion of the compacted inflatable region 222, or stated otherwise, so as to remain at an exterior of the compacted inflatable region 222, rather than being captured within the inflatable region 222.

The inflatable region 222 of the airbag cushion 210 can be compacted or compressed into a compact or packaged state in any suitable manner. For example, in some arrangements, the inflatable region 222 can be one or more of tucked, rolled, folded, bunched, etc. In certain embodiments, compression or compaction of the inflatable region 222 of the airbag may be performed in the directions depicted by the straight arrows in FIG. 3. For example, in some embodiments, the upper and lower ends of the airbag cushion 210 can be tucked in the downward and upward directions, respectively, depicted in FIG. 3. Stated otherwise, the upper and lower ends of the airbag can be inverted or otherwise inserted into the cavity 214 of the airbag cushion 210. Thereafter, the airbag cushion 210 can be rolled and/or folded toward the attachment region 220, as depicted by the rightward arrow in FIG. 3. After the airbag cushion 210 has been compacted toward the attachment region 220 in this manner, a Z-fold, as this term is understood in the art, can be made at each of the upper and lower portions of the airbag cushion to further compact the airbag cushion 210 in the downward and upward directions, respectively. After such a compaction process, the airbag assembly 210 can resemble the configuration depicted in FIG. 5. Directional terms such as upward, downward, and rightward are used in this paragraph with respect to the orientation depicted in FIGS. 3 and 5, and are not necessarily intended to limit possible orientations of the airbag cushion 210.

Figure 3:
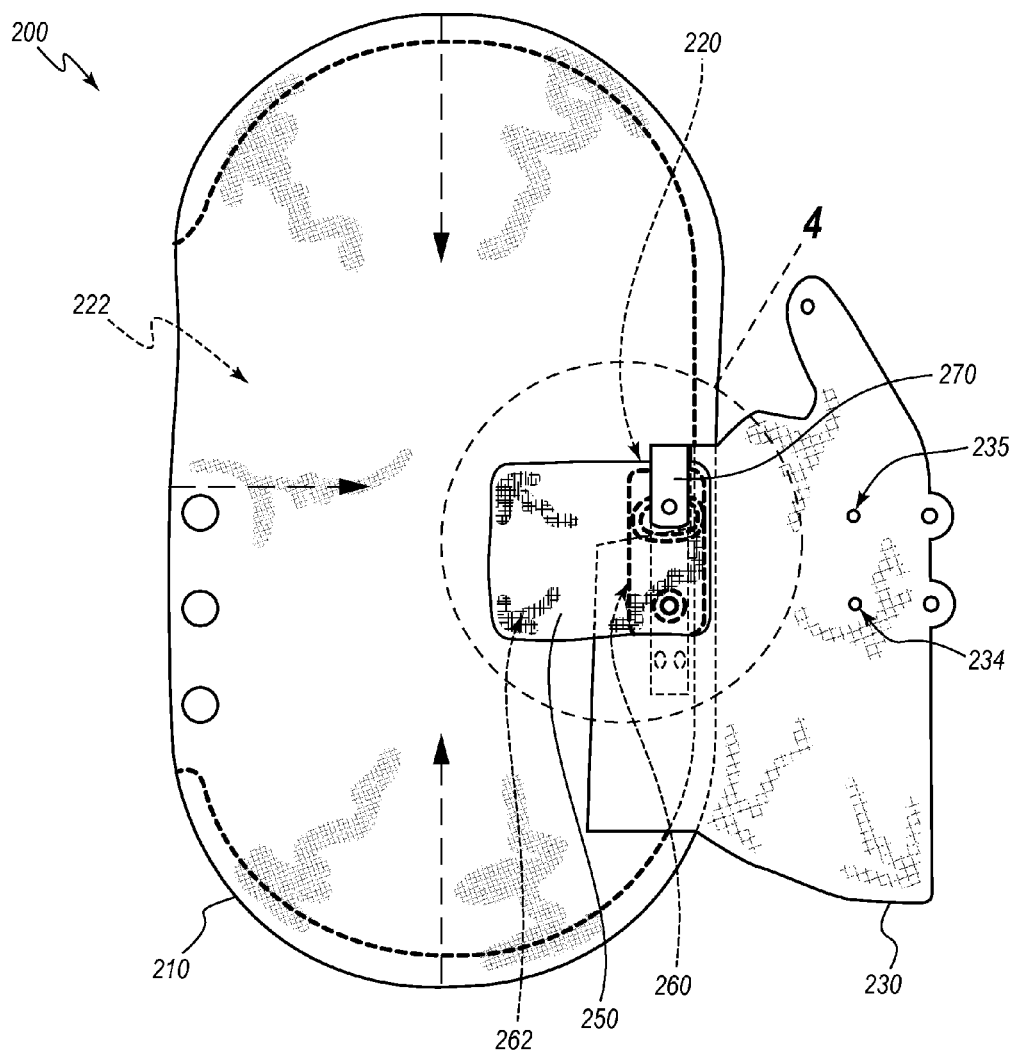
FIG. 3 is a plan view of the side airbag assembly of FIG. 2 in an early stage of manufacture prior to compaction of an embodiment of an airbag cushion.
Figure 5:
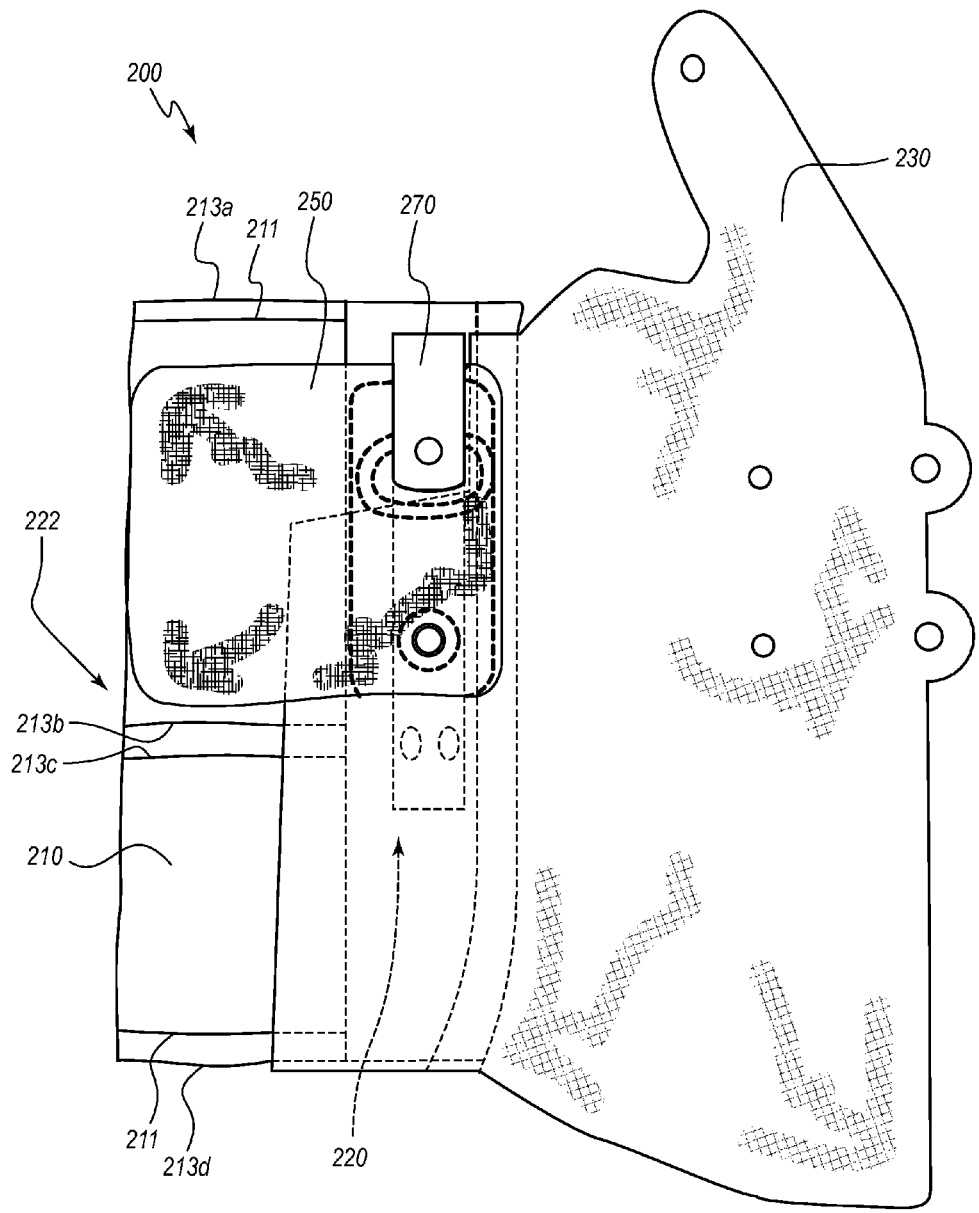
FIG. 5 is a plan view of the airbag assembly of FIG. 2 after the airbag cushion has been compacted.
Figure 6:
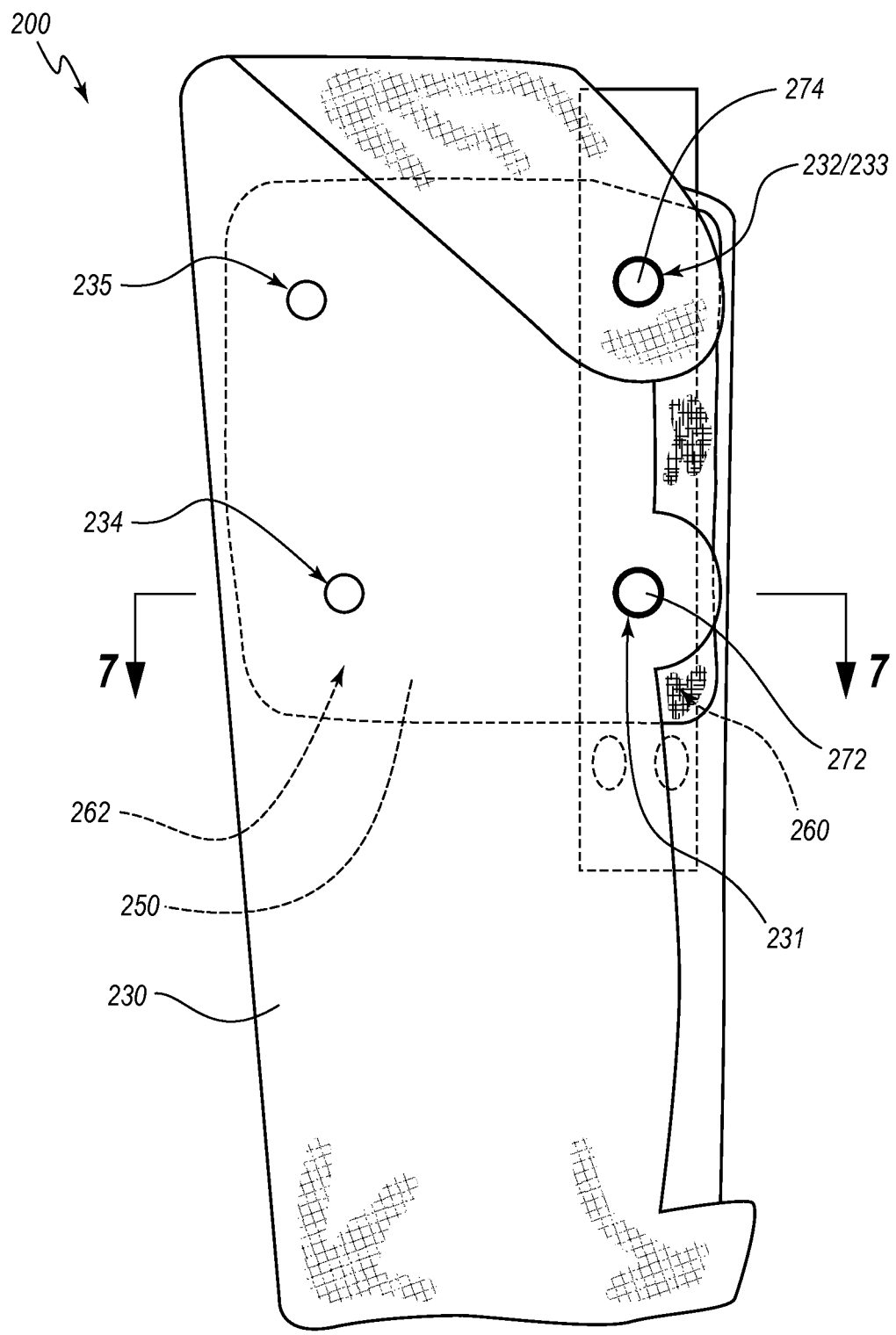
FIG. 6 is a plan view of the airbag assembly of FIG. 2 after an embodiment of a wrapper has been secured about the compacted airbag cushion.

In the embodiment illustrated in FIGS. 3-5, a slightly different folding pattern is employed than that just described, in that the tucking of the upper and lower portions is omitted. That is, with reference again to FIG. 3, the airbag cushion 210 is initially rolled and/or folded toward the attachment region 220, whether as a forward roll and/or as a series of forward folds (e.g., in a direction out of the page) or as a reverse roll and/or as a series of reverse folds (e.g. in a direction into the page). Thereafter, each of the upper and lower portions of the airbag cushion are compacted downwardly and upwardly, respectively, via a Z-fold, the results of which are shown in FIG. 6. The peripheral edge of the airbag cushion 210 is identified by numeral 211. Various fold lines are identified by the numerals 213a, 213b, 213c, 213d.

In certain embodiments, the retaining region 262 of the flap 250 is held out of the way during at least a portion of the foregoing folding procedures. For example, in some assembly processes, the airbag cushion 210 can be folded manually and/or via a folding machine or apparatus. In some instances, the attachment region 220 of the airbag cushion 210 and the anchoring region 260 of the flap 250 are oriented such that gravity pulls the retaining region 262 downwardly and out of the way of the folding of the airbag cushion 210. After folding, the retaining region 262 is positioned over the compacted inflatable region 222 of the airbag 210. In other processes, the retaining region 262 of the flap 250 may be positioned out of the way of the compaction of the airbag cushion 210 in other manners or directions.

At any suitable stage of manufacture of the airbag assembly 200, the inflator 270 may be coupled with the airbag cushion 210. In the illustrated embodiment, a portion of the inflator 270 is inserted through the openings 219, 239, 259 at a stage after the seams 251, 252, 253, 254 have been formed. The insertion may take place before or after the airbag cushion 210 has been reduced to a compacted state.

With reference to FIG. 4, in the illustrated embodiment, the inflator 270 includes two fasteners 272, 274 that project from a body 276 of the inflator 270. The body 276 of the inflator 270 includes inflation ports 278 through which inflation gases exit. In the illustrated embodiment, upon insertion of the inflator 270 into the airbag cushion 210, the inflation ports 278 are at an interior of the airbag cushion 210. Moreover, the fastener 272 extends from an interior of the airbag cushion 210 to an exterior thereof through the openings 218, 238, 258. A portion of the inflator body 276 extends through the openings 219, 239, 259. In some embodiments, the fastener 274 is fully at an exterior of the airbag cushion 210. The fasteners 272, 274 may be of any suitable variety. In the illustrated embodiment, each fastener 272, 274 is a threaded stud to which a nut 282 (see FIG. 7) can be secured.

As shown in FIG. 6, the wrapper 230 can be wrapped about the airbag cushion 210 so as to cover a significant portion of or all of the airbag cushion 210 when the airbag assembly 200 is in the packaged state. For example, the illustrated wrapper 230 covers an entirety of the airbag cushion 210. In certain embodiments, the wrapper 230 is sufficiently flexible to closely conform to an outer contour defined by the airbag cushion 210 in the compacted state. In various embodiments, the wrapper 230 can cover at least a significant portion of the flap 250. As shown in FIG. 6, the illustrated wrapper 230 covers substantially all of the retention region 262 and covers a portion of the anchoring region 260 of the flap 250. Other arrangements are also possible. The wrapper 230 can be held in place by advancing the openings 231, 232 over the fasteners 272, 274, respectively, and by further advancing the opening 233 over the fastener 274.

Figure 7:
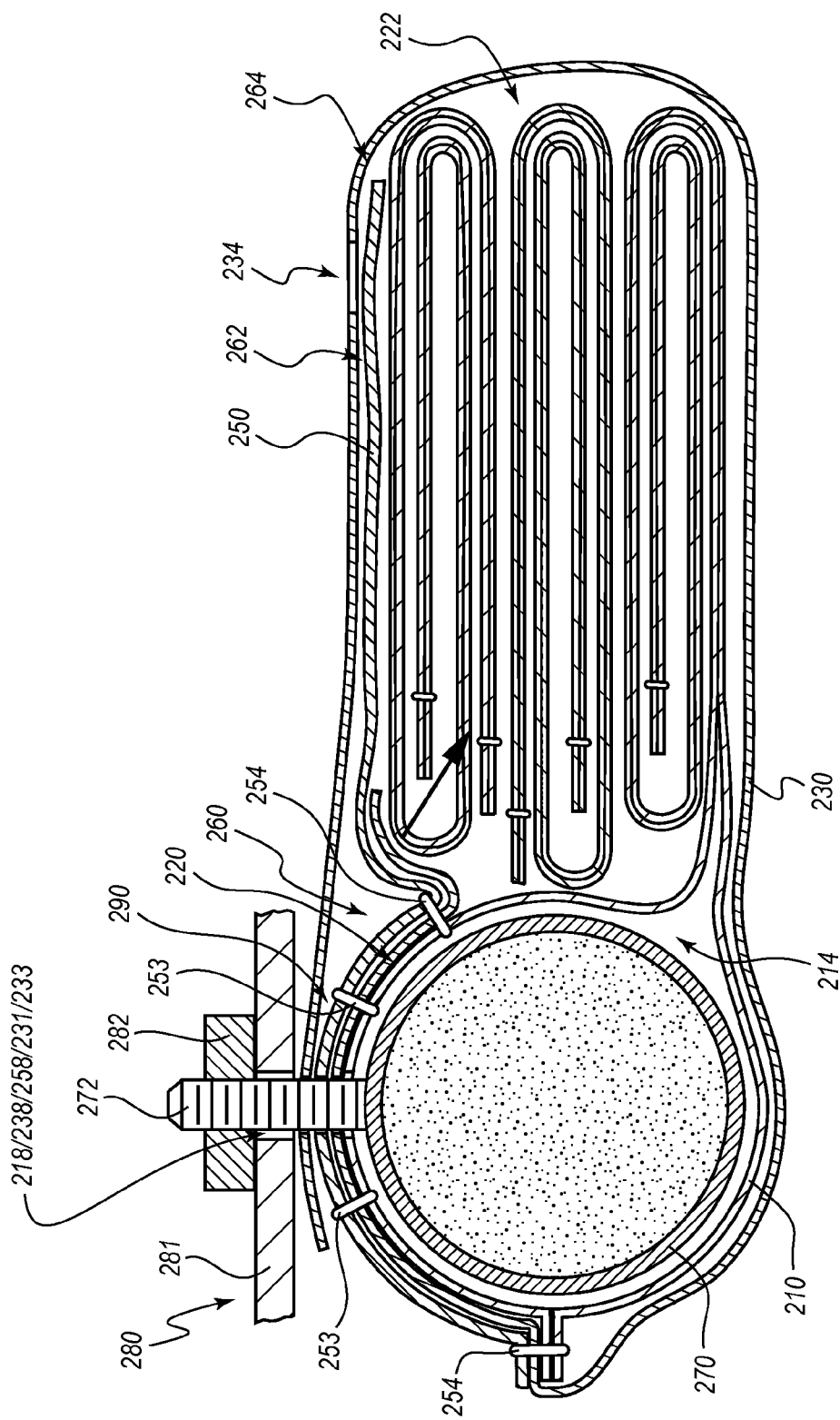
FIG. 7 is a cross-sectional view of the airbag assembly of FIG. 2 taken along the view line 7-7 in FIG. 6, which also depicts attachment of an embodiment of a mounting member to an embodiment of inflator, wherein the mounting member is not shown in FIG. 6.

With reference to FIG. 7, the packaged airbag cushion 210, the flap 250, and the overlying wrapper 230 can be secured to a mounting member 280. The mounting member 280 can comprise any suitable component for securing the airbag assembly 200 to a suitable portion of the vehicle 50, such as to the seatback frame 54. In some arrangements, the mounting member 280 comprises a rigid plate 281, which may comprise a metal or rigid plastic. The mounting member 280 can define openings through which the fasteners 272, 274 pass, and the mounting member 280 can be secured to the airbag cushion 210 by tightening nuts 282 on the fasteners 272, 274. Accordingly, the attachment region 220 of the airbag cushion 210 can be held tightly between the inflator 270 and the mounting member 280. In the drawings, spacing is shown between various components, such as between the inflator 270, the airbag cushion 210, the flap 250, the cover 230, and the mounting member 280. In at least the vicinity of the attachment region 220, however, these components are tightly held against one another. Moreover, other portions of the airbag assembly 100 may also be in closer proximity than what is shown in the drawings, which may result in a relatively tight package overall.

In other embodiments, the mounting member 280 comprises the portion of the vehicle 50 to which the airbag assembly 200 is attached. For example, in some embodiments, the inflator 270 is attached to the seatback frame 54.

In certain embodiments, an outer surface of the inflator 270 and an opposing surface of the mounting member 280 are shaped non-complementarily, which may result in a gap or pinching region 290 between these components when the inflator 270 is attached to the mounting member 280. In the absence of the protective flap 250, the inflatable region 222 of the airbag cushion 210 can have a tendency to get caught in and/or migrate into the pinching region 290. For example, the portion for the inflatable region 222 that includes the upper set of rolls and/or folds in FIG. 7 may get caught within the pinching region 290 during attachment of the mounting member 280 to the inflator 270 and/or may have a natural tendency to shift position into the pinching region 290 thereafter. Such shifting or migrating can occur during original manufacture, such as may result from a tight fit of the cover 290 over the airbag cushion 210, during transport of the airbag assembly 200, and/or, in some instances, during installation of the airbag cushion 210 within the vehicle 50. In some instances, the portion of the inflatable region 222 of the airbag cushion 210 that moves into the pinching region 290 can be pinched by adjacent components. The pinching may itself affect the ultimate deployment of the airbag cushion 210. Moreover, in some instances, the pinching may cause wearing of the airbag cushion 210, and may wear the airbag to the point of developing one or more holes through which inflation gas can escape from the cavity 214 of the airbag 210. Such holes can affect the deployment characteristics of the airbag cushion 210. In some instances, a portion of the inflatable region 222 can move into contact with the fasteners 272, 274, which may lead to the wearing or deterioration of the airbag cushion 210 and the development of one or more undesired holes therein. For example, in some instances, the fasteners 272, 274 are threaded studs, and the threading can be particularly damaging to the airbag cushion 210.

The protective flap 250 can avoid the foregoing pinching and/or wearing of the inflatable region 222 of the airbag cushion 210. In the illustrated embodiment, the retaining region 262 of the protective flap 250 is pulled in a distal direction during manufacture of the airbag assembly 200. This pulling action urges the upper, proximal portion of the inflatable region 222 in the direction depicted by a bold arrow in FIG. 7. That is, the inflatable region 222 is urged in a direction away from the pinching region 290, or in a direction away from the attachment region 220 of the airbag cushion 210. The flap 250 can be said to pull the inflatable region 222 away from the attachment region 220 to prevent pinching.

In the illustrated embodiment, the seam 254 is at a position that is lower than the upper surface of the inflatable region 222 of the airbag cushion 210. As the protective flap 250 is pulled distally, the flap 250 can impart both a horizontal and downward force to the inflatable region 222, in the orientation depicted in FIG. 7.

In some embodiments, the protective flap 250 continues to pull the inflatable region 222 in the manners just discussed after manufacture of the airbag assembly 200 is complete. For example, in some embodiments, the protective flap 250 remains extended, such as due to frictional forces between the interior surface of the wrapper 230 and the upper surface of the inflatable region 222 of the airbag cushion 210. In some embodiments, the compressed configuration of the inflatable region 222 within the wrapper 230 gives rise to significant frictional forces between the airbag cushion 210, the protective flap 250, and the wrapper 230. For example, in some instances, the Z-folds discussed above can provide the inflatable region 222 with a natural bias that tends to urge the various sets of rolls and/or folds depicted in FIG. 7 away from one another. This bias can cause the inflatable region 222 to press against the flap 250, which can cause the flap 250 to remain in an extended state and continue to pull the inflatable region 222 away from the pinching region 290 and/or prevent the inflatable region 222 from moving toward the pinching region 290.

In some embodiments, the one or more seams 253, 254 can also provide a barrier to prevent the inflatable region 222 from migrating into the pinching region 290. A portion of each of the seams 253, 254 is positioned between the inflatable region 222 and the openings 218, 238, 258, 231, 233 through which the fastener 272 extends. The protective flap 250 and the portion of the airbag cushion 210 that encompasses the inflator 270 extend outwardly from the seam 254 in different directions to encompass a proximal portion of the inflatable region 222. In such an arrangement, the seam 254 can act as a barrier between the inflatable region 222 and the openings 218, 238, 258, 231, 233, or more particularly, as a barrier between the inflatable region 222 and the fastener 272. The protective flap 250 and associated seams can provide similar protection relative to the fastener 274, as well as other portions of the pinching region 290 that positioned between the fasteners 272, 274.

In some instances, even if frictional forces acting on the protective flap 250 are insufficient to maintain the flap 250 in the extended arrangement shown in FIG. 7, the flap 250 can protect the inflatable region 222 from migrating into the pinching region 290 and/or from contacting the fastener 272. For example, in some embodiments, the flap 250 may be relatively stiff. In other embodiments, the flap 250 may comprise a durable material that acts as a shield or barrier.

Figure 8:
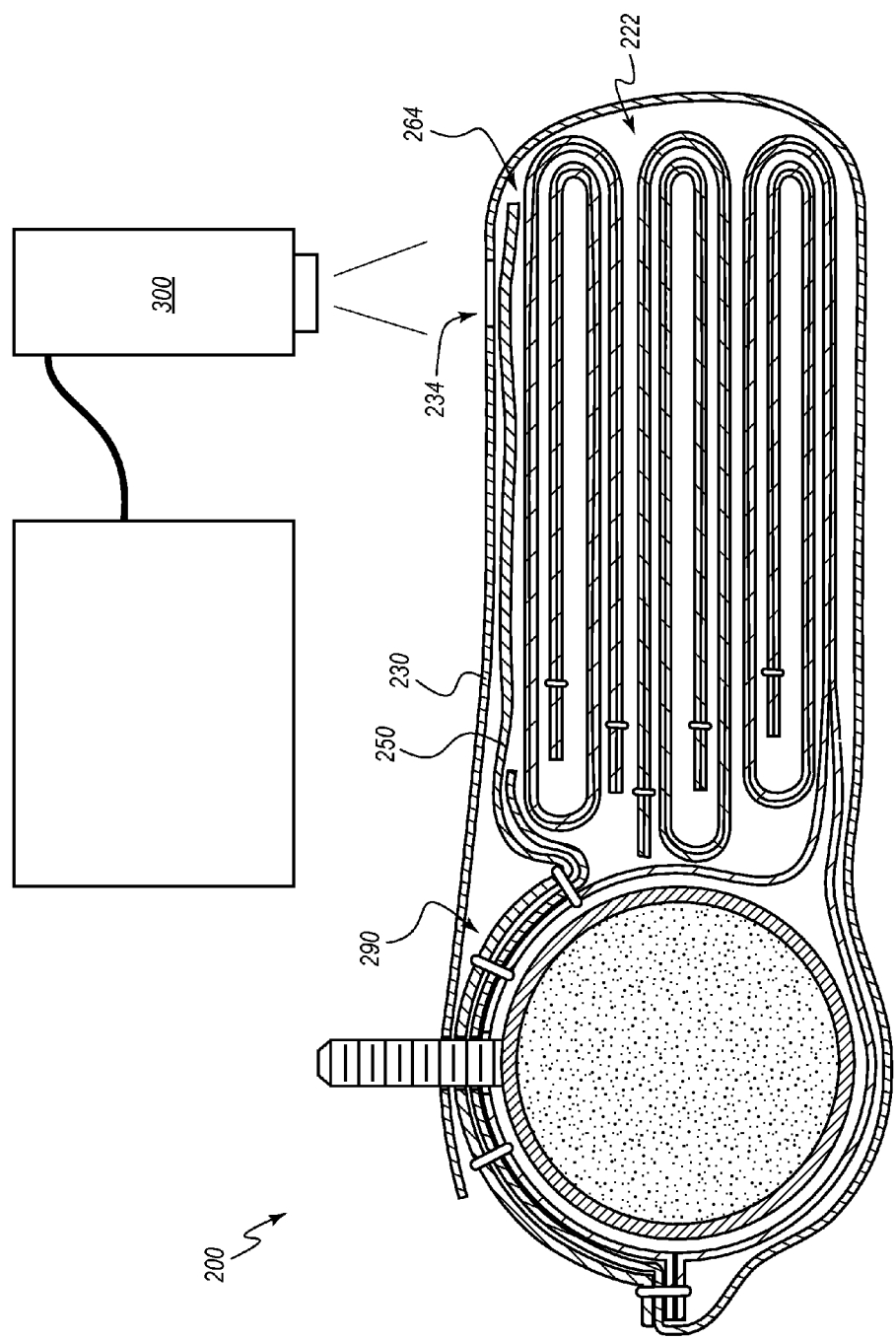
FIG. 8 is a cross-sectional view of the airbag assembly of FIG. 2 taken along the view line 7-7 in FIG. 6, which also depicts a schematic elevation view of an embodiment of an optical sensor in use with the airbag assembly.

With reference to FIG. 8, some manufacturing methods employ one or more of the openings 234, 235 (see also FIG. 2) in the wrapper 330 to determine whether the flap 250 has pulled the inflatable region 222 away from the pinching region 290 and/or is in a desired position for further preventing the inflatable region 222 of the airbag cushion 20 from entering the pinching region 290. In certain embodiments, when the distal end 264 has been pulled distally past the opening 234 (and past the opening 235), the flap 250 provides sufficient protection for the inflatable region 222. In some instances, the length of the flap 250 is selected or predetermined such that the flap 250 can extend past the openings 234, 235 by only a small amount (e.g., 5, 10, or 15 millimeters) and provide the desired pulling. An optical sensor 300 of any suitable variety may be used to determine whether the flap 250 is properly positioned. In some embodiments, a contrast in the colors of the wrapper 330 and the flap 250 may assist with the detection of proper positioning. For example, in some instances the wrapper 230 may be relatively light (e.g., white) and the flap 250 may be relatively dark (e.g., black). Other methods may be used to determine desired placement, such as visual inspection.

In some instances, the optical sensing depicted in FIG. 8 takes place before securing a plate 281 to the inflator 270. In other instances, the optical sensing is performed prior to shipping the airbag assembly 200 for installation in a vehicle.

As previously discussed, the airbag assembly 200 can be installed in a vehicle, such as within the bolster of a seat 50. The airbag assembly 200 can be secured to the frame 54. In a deployment event, the airbag cushion 210 can fill with inflation gas and expand outwardly from the seat 50. In particular, the inflatable region 222 can move away from the attachment region 220 of the airbag cushion 210. In certain embodiments, the protective flap 250 can remain intact as a unitary piece of material throughout deployment of the airbag cushion 210. For example, in various embodiments, no portion of the protective flap 250 bursts, breaks, or otherwise separates to permit the airbag cushion 210 to pass through it.

As previously mentioned, in the illustrated embodiment of the airbag assembly 200, the free end 264 of the protective flap 250 is unattached to the airbag cushion 210 and is unattached to the wrapper 230. In other embodiments, the protective flap 250 may be temporarily secured to one or more of the airbag cushion 210 or the wrapper 230. For example, on or more tack stitches, adhesives, or other temporary fasteners may be used to secure the flap 250 to one or more of the airbag cushion 210 or the wrapper 230 in an extended or otherwise protective orientation. The one or more fasteners can maintain the flap 250 in the protective orientation up through deployment of the airbag cushion 210, at which point the airbag cushion 210 can separate from the flap 250. In some instances, the flap 250 may remain attached to the wrapper 230.

With reference again to FIG. 4, other embodiments can have arrangements that are altered from the depicted arrangement. For example, in some embodiments, the protective flap 250 is positioned only at one side of the inflator 270, such as at the left side of the inflator 270 in the orientation shown in FIG. 4. In certain of such embodiments, one or more seams that are positioned only at the left side of the inflator 270 can be used to attach the protective flap 250 to the airbag cushion 210. In some embodiments, the protective flap 250 is attached only to the attachment region 220 of the airbag cushion 210, and thus may not be attached to the wrapper 230

In other embodiments, the protective flap 250 may be unattached relative to the airbag cushion 210. For example, the protective flap 250 may only be attached to the wrapper 230. In other embodiments, the protective flap 250 may be attached to one or more of the fasteners 272, 274. In certain of the foregoing embodiments, although the protective flap 250 may not be attached directly to the airbag cushion 210, the attachment region 260 of the protective flap may nevertheless be substantially fixed relative to the attachment region 220 of the airbag cushion 210, particularly when the fasteners 272, 274 have been secured to a mounting member 280 of any suitable variety.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

It will be apparent to those having skill in the art that changes may be made to the details of the above-described embodiments without departing from the underlying principles herein. The claims are as follows.

The invention claimed is:

1. An airbag assembly comprising:
    an airbag cushion that comprises an attachment region that is configured to be secured in a fixed relationship to a mounting member via which the airbag assembly can be secured to a vehicle and further comprises an inflatable region in a compacted state, wherein the inflatable region is configured to expand when filled with inflation gas during a deployment event to move away from the mounting member; and
    a protective flap that comprises an anchoring region that is substantially fixed relative to the attachment region of the airbag cushion and comprises a retaining region that extends away from the anchoring region and terminates at a free end, wherein the protective flap is exterior to the inflatable region and positioned over at least a portion of the inflatable region to prevent the inflatable region of the airbag cushion from moving toward the attachment region of the airbag cushion and being pinched due to securement of the attachment region to the mounting member.

2. The airbag assembly of claim 1, wherein the protective flap is configured to remain intact as a unitary piece of material throughout deployment of the airbag cushion.

3. The airbag assembly of claim 1, wherein the anchoring region of the protective flap is at a proximal end of the protective flap and is secured to the attachment region of the airbag cushion, and wherein the free end of the protective flap is at a distal end that is opposite from the proximal end.

4. The airbag assembly of claim 1, wherein the anchoring region of the protective flap is at a single end of the protective flap, and wherein no remaining portion of the protective flap is permanently attached to any other portion of the airbag assembly.

5. The airbag assembly of claim 1, wherein the attachment region of the airbag cushion defines one or more openings through which fasteners can extend to secure the airbag cushion to the mounting member, wherein the assembly further comprises a seam that attaches the anchoring region of the protective flap to the attachment region of the airbag cushion, and wherein at least a portion of the seam is positioned between the inflatable region of the airbag cushion and the one or more openings of the airbag cushion.

6. The airbag assembly of claim 1, further comprising one or more fasteners that are configured to secure the attachment region of the airbag cushion to the mounting member, wherein the protective flap is configured to prevent the inflatable region of the airbag cushion from coming into contact with the one or more fasteners.

7. The airbag assembly of claim 6, further comprising an inflator from which the one or more fasteners extend, wherein each of the one or more fasteners comprises a threaded stud that extends through the airbag cushion.

8. The airbag assembly of claim 1, further comprising an inflator that comprises inflation ports, wherein the inflation ports of the inflator are at an interior of the airbag cushion, and wherein the inflator is configured to cooperate with the mounting member to secure the attachment region of the airbag cushion to the mounting member.

9. The airbag assembly of claim 1, wherein the attachment region of the airbag cushion and the anchoring region of the protective flap define aligned openings that are sized to receive a portion of an inflator into an interior of the airbag cushion.

10. The airbag assembly of claim 1, further comprising a flexible wrapper that covers at least a portion of each of the airbag cushion and the protective flap.

11. The airbag assembly of claim 10, wherein the protective flap comprises an outwardly facing surface that frictionally engages an inner surface of the wrapper and further comprises an inwardly facing surface that frictionally engages an outer surface of the inflatable region of the airbag cushion, and wherein frictional engagement of the protective flap maintains the protective flap in an extended orientation in which the protective flap pulls the inflatable region of the airbag cushion away from the attachment region of the airbag cushion.

12. The airbag assembly of claim 10, wherein the wrapper comprises one or more openings through which a presence of the protective flap can be observed to ensure that the protective flap is in a position in which it urges the inflatable region of the airbag cushion away from the attachment region of the airbag cushion.

13. The airbag assembly of claim 1, further comprising the mounting member secured to the airbag cushion, wherein the mounting member comprises a plate.

14. An airbag assembly comprising:
an airbag cushion that comprises an attachment region and an inflatable region that is in a compacted state, wherein the inflatable region is configured to expand when filled with inflation gas during a deployment event;
a fastener positioned at the attachment region of the airbag cushion, wherein the fastener is configured to secure the attachment region of the airbag cushion to a mounting member via which the airbag assembly can be secured to a vehicle; and
a protective flap exterior to the inflatable region that comprises an anchoring region and a retaining region that extends away from the anchoring region and is positioned over at least a portion of the inflatable region of the airbag cushion, wherein the anchoring region of the protective flap is secured to the attachment region of the airbag cushion, and wherein the retaining region of the protective flap provides sufficient force to the inflatable region of the airbag cushion in a direction away from the fastener to prevent the inflatable region of the airbag cushion from moving into contact with the fastener.

15. The airbag assembly of claim 14, wherein the anchoring region of the protective flap is secured to the attachment region of the airbag cushion via a seam that is positioned between the fastener and the retaining region of the protective flap.

16. The airbag assembly of claim 14, further comprising an inflator, wherein at least a portion of the inflator is positioned at an interior of the airbag cushion, and wherein the fastener comprises a stud that extends from the inflator through the airbag cushion.

17. The airbag assembly of claim 14, further comprising a flexible wrapper that encompasses at least a portion of the airbag cushion and is positioned over at least a portion of the protective flap, wherein the fastener extends through the airbag cushion and the flexible wrapper.

18. The airbag assembly of claim 14, wherein the protective flap is configured to remain intact as a unitary piece of material during deployment of the airbag cushion.

19. An airbag assembly comprising:
an airbag cushion that comprises an inflatable region that is in a compacted state and is configured to expand when filled with inflation gas during a deployment event;
an inflator of which at least a portion is at an interior of the airbag cushion;
a fastener extending from the inflator through the airbag cushion, wherein the fastener is configured to secure the airbag cushion to a mounting member via which the airbag assembly can be secured to a vehicle;
a protective flap that extends over at least a portion of the inflatable region of the airbag cushion and provides sufficient force to the inflatable region in a direction away from the fastener to prevent the inflatable region from moving into contact with the fastener; and
a flexible wrapper that encompasses at least a portion of the airbag cushion and is positioned over at least a portion of the protective flap.

20. The airbag assembly of claim 19, wherein the protective flap is secured to the airbag cushion via a seam that defines a barrier between the inflatable region of the airbag cushion and the fastener.

* * * * *